Sept. 20, 1966  J. L. HARDIN ETAL  3,273,474
EPOXY FLOOR LAYING MACHINE

Filed Dec. 26, 1963  4 Sheets-Sheet 1

INVENTORS
Johnny L. Hardin
Harold R. Johnston
by
ATTORNEYS

Sept. 20, 1966       J. L. HARDIN ETAL            3,273,474
                  EPOXY FLOOR LAYING MACHINE
Filed Dec. 26, 1963                            4 Sheets-Sheet 4
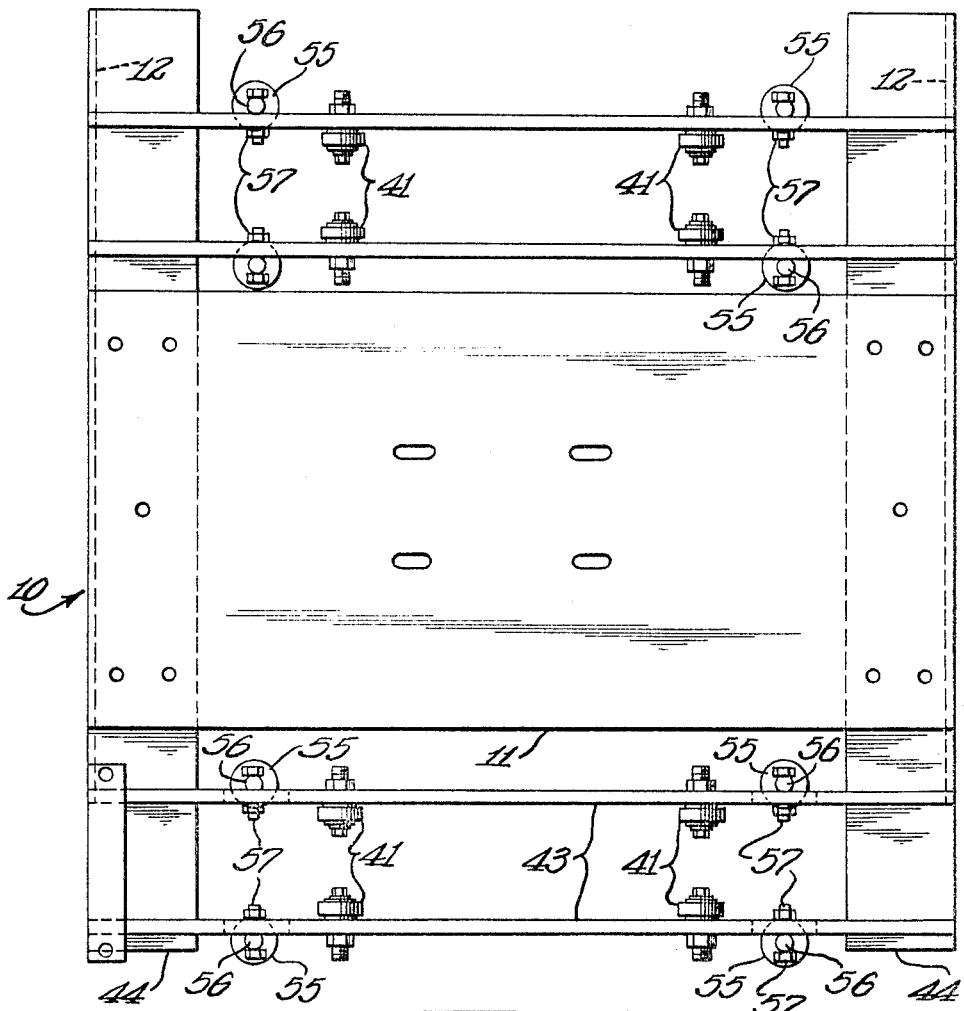
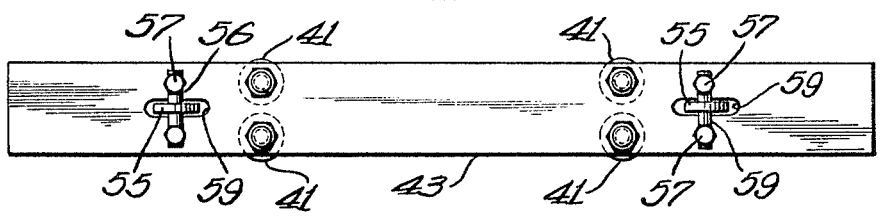
INVENTORS
Johnny L. Hardin
Harold R. Johnston
by
ATTORNEYS United States Patent Office 3,273,474
Patented Sept. 20, 1966

3,273,474
EPOXY FLOOR LAYING MACHINE
Johnny L. Hardin, Little Rock, and Harold R. Johnston, Bigelow, Ark., assignors to Clark Equipment Co., Inc., Little Rock, Ark., a corporation of Arkansas
Filed Dec. 26, 1963, Ser. No. 333,325
4 Claims. (Cl. 94—45)

This invention relates to improvements in floor laying machines and more particularly relates to such a machine particularly adapted to lay plastic floors.

A principal object of the present invention is to provide an improved form of apparatus for laying and finishing plastic flooring materials of a selected depth.

Another object of the invention is to provide a novel form of apparatus for spreading and finishing plastic flooring materials by power and arranged with a view toward utmost simplicity in construction and efficiency in operation.

A further object of the invention is to provide a floor laying machine for spreading and finishing plastic flooring materials such as epoxy resins to a selected depth in which the machine is drawn along the surface to be covered and the spreading and finishing are attained by reciprocably movable spreading and finishing bars moving transversely of the line of travel of the machine.

Still another object of the invention is to provide a machine for laying plastic floors, such as epoxy resin floors, in which the frame of the machine is supported on runners to be drawn along the floor, and in which reciprocable carriages movable transversely of the direction of travel of the machine are supported between the front and rear end portions of the runners for movement across the front and rear of the machine and are reciprocably driven by power to effect a floor spreading and smoothing operation.

These and other objects of the invention will appear from time to time as the following specification proceeds and with reference to the accompanying drawings wherein:

FIGURE 4 is a plan view of the main frame of the machine with the operating parts removed;

FIGURE 5 is a view in side elevation of the main frame shown in FIGURE 4 with the supporting runners therefor removed;

FIGURE 7 is a fragmentary view in side elevation illustrating certain details of the spreader bar for spreading the flooring material.

Figure 1:
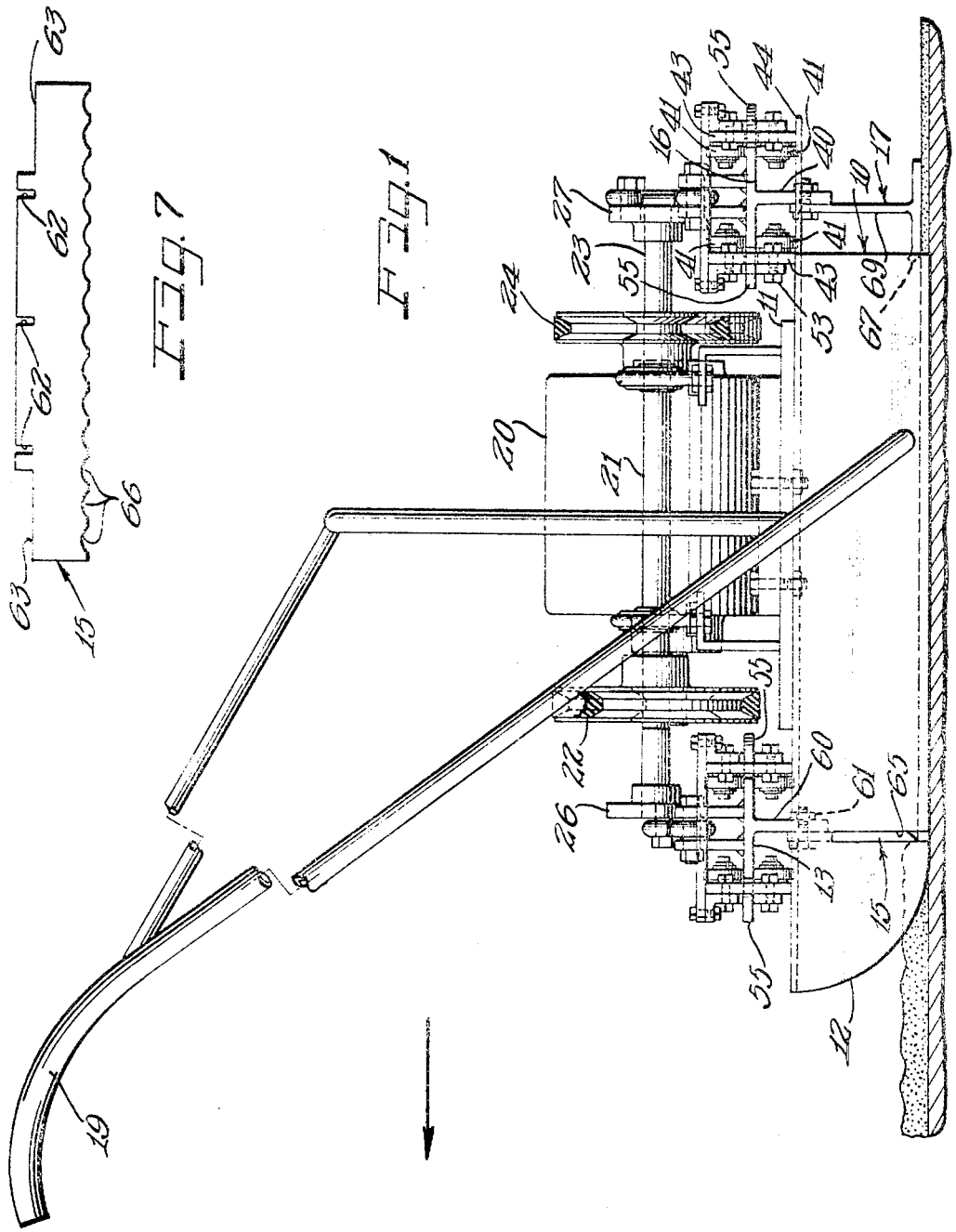
FIGURE 1 is a view in side elevation of a floor laying machine constructed in accordance with the principles of the present invention.

In the embodiment of the invention illustrated in the drawings, I have shown in FIGURE 1 a floor laying machine for spreading and finishing plastic flooring materials, such as epoxy resin flooring materials. The machine shown in the drawings generally includes a main frame 10 including a base plate 11 mounted on runners 12 and having a reciprocably movable carriage 13 at the forward end thereof carrying a spreader bar 15 and a second reciprocably movable carriage 16 at the rear end of the machine carrying a smoothing trowel 17. The machine is also shown as having a handle structure 19 welded or otherwise secured to the outer sides of the runners 12 and extending angularly upwardly and forwardly therefrom, to enable the machine to be drawn along the surface to be floored by hand. The pulling handle may be supplemented by a power feed (not shown) if desired.

Figure 2:
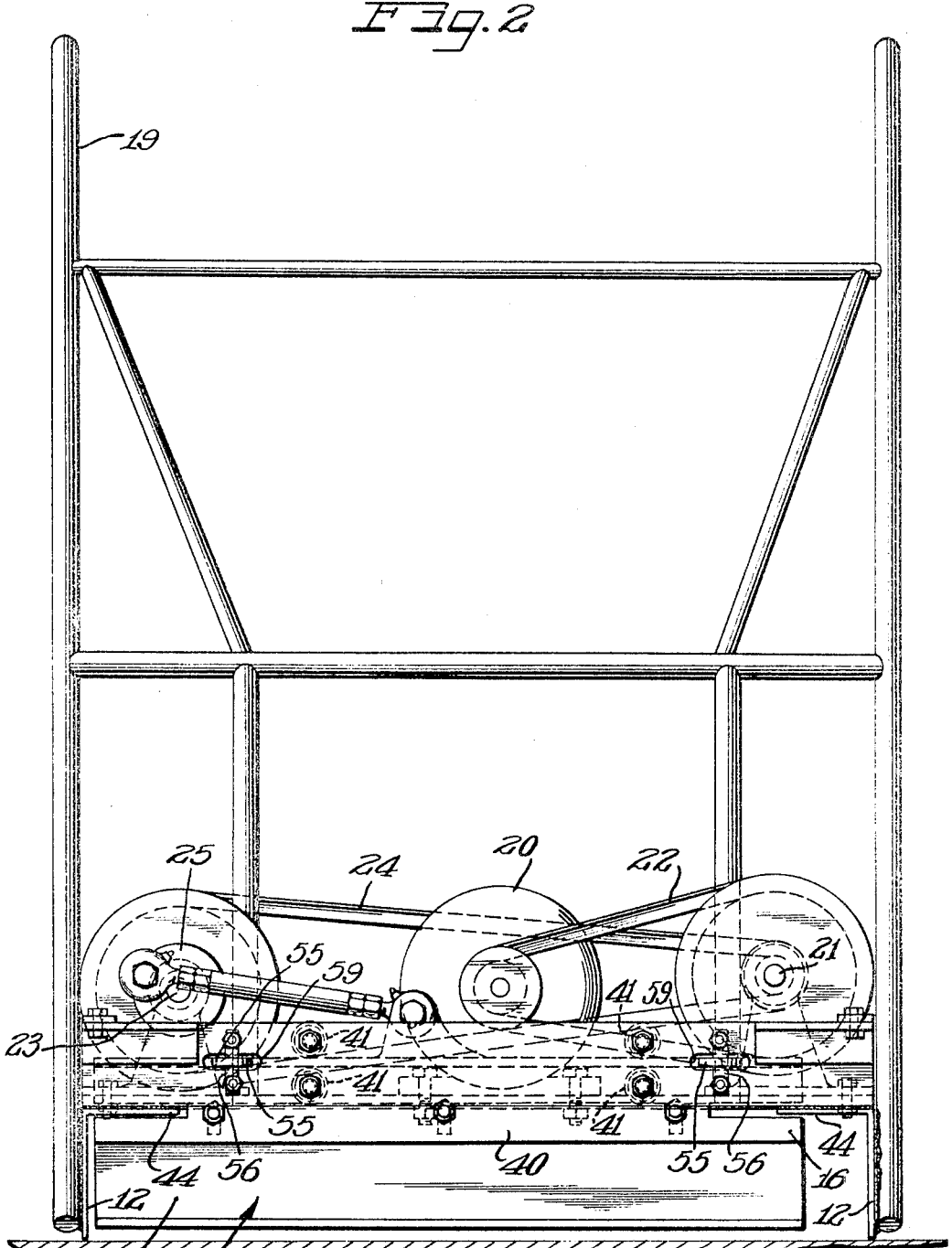
FIGURE 2 is a rear end view of the machine shown in FIGURE 1.
Figure 3:
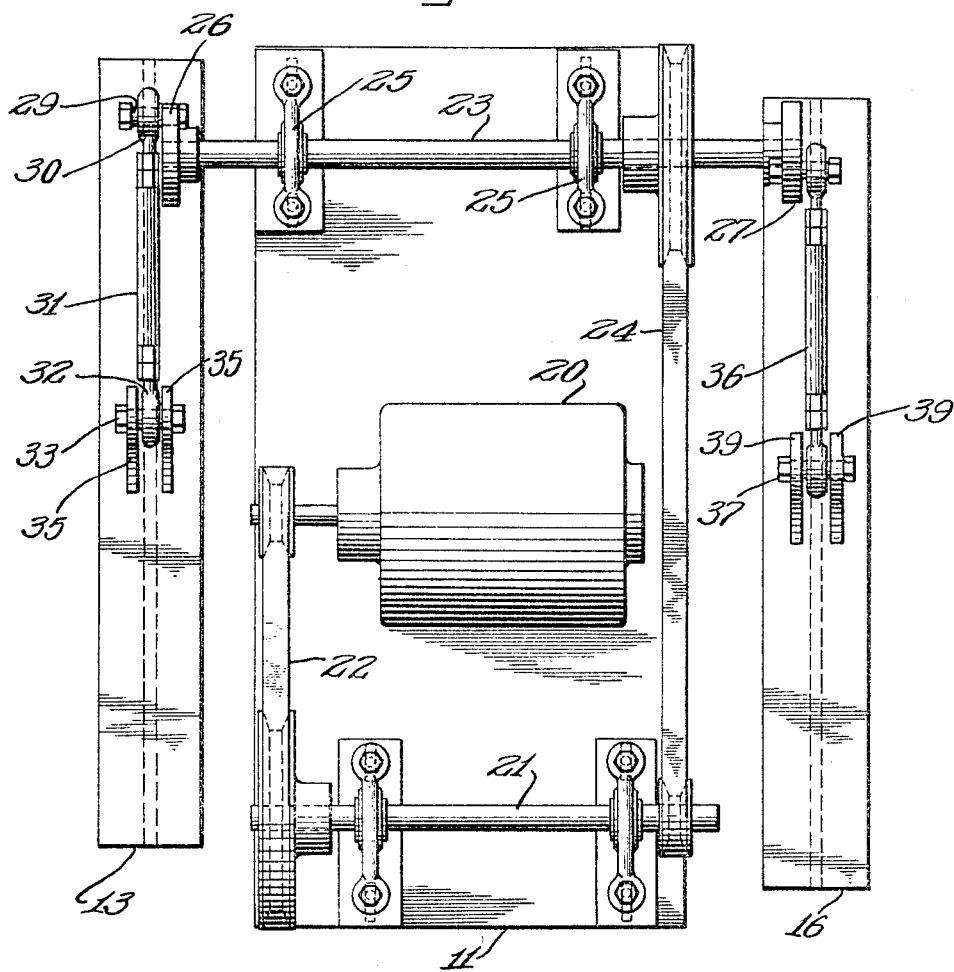
FIGURE 3 is a fragmentary plan view of the machine with the runners and supports for the reciprocably movable carriages removed and showing the drive means for reciprocably driving the carriages.

The base 11 is shown as having a motor 20 mounted thereon for reciprocably driving the carriages 13 and 16. As shown in FIGURES 1, 2 and 3, the motor 20 drives a countershaft 21 journalled at one side of the base 11, through a V-belt drive 22. The countershaft 21 in turn drives a crankshaft 23 at the opposite side of the base 11 from the countershaft 21 through a V-belt drive 24. The crankshaft 23 is journalled on the base 11 in bearing supports 25, 25 and projects beyond opposite ends of said base and has a crank 26 at one end thereof and another crank 27 at the opposite ends thereof. The cranks 26 and 27 are herein shown as being 180° out of phase with respect to each other, the crank 26 reciprocably moving the front carriage 13 and the crank 27 reciprocably moving the rear carriage 16. The crank 26 is connected with the carriage 23 through a crank pin 29, having a connector 30 journalled thereon. The connector 30 forms a part of a link 31 having a connector 32 at its end opposite the crank 26 and journalled on a pin 33 mounted on spaced connector ears 35, 35, extending upwardly of the carriage 13 intermediate the ends of said carriage. The crank 27 reciprocably drives the carriage 16 in a like manner, through a link 36 journalled at one end on said crank and journalled at its opposite end on a transverse pin 37 mounted on spaced ears 39, 39 extending upwardly of the carriage 16 intermediate the ends of said carriage.

The carriages 13 and 16 are of a similar construction and are supported in a similar manner so the support for the carriage 16 only will be described in detail and the same part numbers will be applied to the supports for each carriage.

The carriage 16 is shown in FIGURE 1 as being in the general form of a T-iron having a depending stem 40 forming a mounting for the smoother trowel 17. The carriage 16 is supported on the flanges thereof between vertically and longitudinally spaced pairs of rollers 41, 41, mounted on parallel longitudinally spaced transversely extending vertical plates 43 extending across and upwardly of the top surfaces of the runners 12 and suitably mounted on spaced plates 44 extending along and inwardly of said runners. The runners 12 may be the vertical legs of angle irons and the plates 44 may be the horizontal legs of the angle irons.

The base plate 11 and plates 44 secured thereto and extending along opposite sides and beyond opposite ends of said base plate and supported on the runners 12 are intended to comprise the main frame 10 of the machine.

Figure 6:
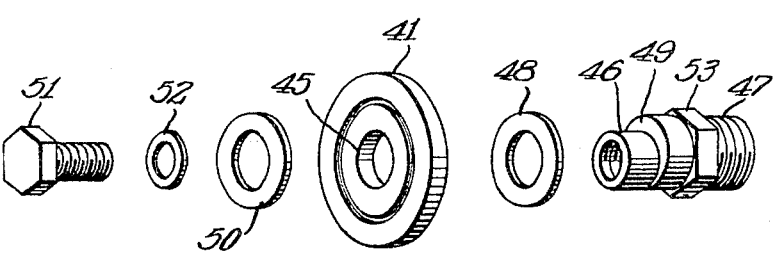
FIGURE 6 is an exploded view showing a roller support for a reciprocably movable carriage.

The rollers 41 may be the outer races of ball bearings having inner races 45 mounted on pins 46 extending from threaded supports 47 eccentrically of the axes of said supports. As shown in FIGURE 6, a washer 48 is mounted on the pin 46 and abuts a shoulder 49 eccentric of said pin. Another washer 50 abuts the opposite side of the inner race 45. The washers 48, roller 41, and washer 50, are retained to the pin 46 as by a cap screw 51 and washer 52 engaging the washer 50 with the inner race of the ball bearing forming the roller 41. A nut 53 is threaded on the outer end of each threaded support to retain said support in position to support its roller 41 on the inside of the upright plate 43 and to accommodate adjustment of the spacing between the rollers 41 by turning movement of the support member to bring the axis of the eccentric pin upwardly or downwardly with respect to the axis of the nut 53. As shown in FIGURES 3, 4 and 5, two sets of vertically spaced rollers 41 are mounted on the inside of each plate 43 to form a reciprocable support for the oscillating carriage 16 and to retain said carriage in position during oscillatable movement thereof.

Laterally spaced horizontal rollers 55 are mounted on the plates 43 to engage opposite sides of the flange of a T-shaped carriage 16 and guide said carriage for rectilinear movement between the plates 43, 43. The horizontal rollers are mounted on vertical shafts 56 extending along the outsides of the plates 43 and secured to said plates as by nuts and bolts 57 extending through said shafts and retaining said shafts to the outsides of said plates. The horizontal rollers 55 may be the outer races of ball bearings and extend through slots 59 in the plates 43 to engage the opposite sides or edges of the respective carriage. The carriage 13 has a depending stem 60, like the stem 40 of the carriage 16. The stem 60 has a plurality of spaced horizontally aligned nuts and bolts 61 mounted thereon engaging upwardly opening slots 62 in the spreader bar 15. The outwardly opening slots 62 accommodate vertical adjustment of the spreader bar in accordance with the thickness of the floor to be laid. The spreader bar 15 also has downwardly recessed end portions 63 accommodating opposite ends of said spreader bar to extend through vertical slots 65 formed in the runners 12 and forming a guide for said spreader bar. The bottom surface of the spreader bar 15 is shown in FIGURE 7 as being scalloped as indicated by reference character 66, the rear surfaces of the scallops of which are beveled to provide relatively sharp edges at the scallops accommodating said spreader bar when reciprocably moving back and forth and when drawn forwardly along the newly laid plastic flooring to spread the flooring into a relatively uniform layer which may later be smoothed by the smoothing trowel 17.

The smoothing trowel 17 has a relatively flat bottom smoothing surface having an upwardly curved advance end portion 67 and a vertical stem extending upwardly therefrom intermediate the ends of said trowel. The stem 69 has upwardly opening slots (not shown) formed therein and forming a means for adjustably bolting said smoothing trowel to the depending stem 40 of the carriage 16.

During a floor laying operation, the floor is first poured by pouring or placing a semi-liquid epoxy resin flooring material thereon. The floor laying machine is then moved onto one end portion of the floor and the motor 20 is started in operation. The machine is then drawn along the floor with the reciprocably movable carriage 13 and spreader bar 15 spreading the plastic floor material to a layer of a relatively uniform thickness. The smoother trowel when moving along the spread plastic flooring material will then smooth the material and place a finish on the flooring in a relatively simple manner.

It should here be understood that the runners 12 ride along a surface which is being floored and that the bottom edges of the spreader bar and smoothing trowel are always spaced above the bottom edges of the runners, the thickness of the floor being determined by the spacing between the bottom surfaces of the spreader bar and smoother trowel above the bottom surfaces of the runners 12. Where more than one pass must be taken to lay a floor of the desired width, the grooves left by the runners may afterwards be filled and leveled by hand, at which time the surface of the floor may further be smoothed by hand where it is desired that the floor have a highly polished surface.

While we have herein shown and described one form in which our invention may be embodied, it should be understood that various variations and modifications in the invention may be attained without departing from the spirit and scope of the novel concepts thereof.

We claim as our invention:

1. In a machine for laying plastic floors, a main frame, runners movable along the surface to be floored supporting said main frame in vertically spaced relation with respect to the floor, a pair of laterally spaced supports extending transversely of said main frame at the front and rear ends thereof, laterally and vertically spaced rollers mounted on each pair of supports, a separate carriage supported between said rollers on each pair of supports for movement transversely of said main frame, a motor, means driven by said motor for reciprocably driving said carriages, a spreader bar secured to and depending from the forwardmost of said carriages and having a scalloped bottom surface beveled to provide sharp edges at the scallops, a smoothing trowel secured to and depending from the rearwardmost of said carriages, and means mounting said spreader bar and trowel shoe on said carriages for vertical adjustable movement with respect to the ground engaging surfaces of said runners in accordance with the thickness of the floor to be laid.

2. In a machine for laying plastic floors, a main frame including a base, plates extending along opposite sides of said base beyond the forward and rear ends thereof, ground engaging runners supporting said plates and base in vertically spaced relation with respect to the ground, a pair of parallel laterally spaced transversely extending supports spaced from each end of said base and supported on said plates, each of said supports having two sets of vertically spaced rollers on the inner side thereof mounted for rotational movement about horizontal axes, a carriage supported between said sets of rollers on each pair of said forwardly and rearwardly spaced supports for reciprocable movement transversely of said supports, a motor mounted on said base and means driven by said motor for reciprocably driving said carriages, each carriage having a depending stem disposed between said rollers, a spreader bar in association with the forwardmost stem and having a scalloped bottom surface beveled to provide sharp edges at the scallops, means securing said spreader bar to said stem and accommodating adjustable movement of said spreader bar with respect to the ground, a smoothing trowel in association with the rearwardmost stem, means securing said smoother trowel to said stem and accommodating adjustment of said smoother trowel with respect to the bottom surfaces of said runners to determine the thickness of the floor being laid.

3. A machine for spreading and smoothing epoxy resin flooring material comprising a base, parallel spaced runners supporting said base in vertically spaced relation with respect to the ground, a motor on said base, a crankshaft extending parallel to the direction of travel of said base and journalled on said base, a drive connection from said motor to said crankshaft, a pair of parallel spaced supports in advance of and rearwardly of said base and mounted on said runners, vertically spaced rollers mounted on said parallel supports in facing relation with respect to each other, a separate reciprocably movable carriage mounted between each two of said supports and between said sets of rollers and supported by said rollers for reciprocable movement with respect to said base, cranks on opposite ends of said crankshaft, linkage connections between said cranks and carriages for reciprocably moving said carriages transversely of said base, a spreader bar carried by the forwardmost of said carriages and having a scalloped bottom surface beveled to provide sharp edges at the scallops, a smoothing trowel carried by the rearwardmost of said carriages, means mounting said spreader bar on the associated carriage for vertical adjustable movement with respect to the ground, other means mounting said smoothing trowel on its associated carriage for vertical adjustable movement with respect to the ground, the spacing between the bottom of said spreader bar and the bottom of said smoother trowel with respect to the ground being equal to the thickness of the floor to be laid.

4. A machine for spreading and smoothing epoxy resin material comprising, a base, parallel spaced runners supporting said base in vertically spaced relation with respect to the ground, a motor on said base, a crankshaft extending parallel to the direction of travel of said base and journalled thereon, a drive connection from said motor to said crankshaft, two parallel support plates supported on said runners in advance of said base and extending transversely thereof, two other parallel support plates supported on said runners rearwardly of said base and extending transversely thereof, each two support plates having facing longitudinally and vertically spaced rollers rotatably mounted thereon, individual carriages mounted between said rollers and between each two support plates for reciprocable movement with respect to said base in a direction transversely of said runners, a spreader bar mounted on and depending from the forwardmost of said carriages and having a scalloped bottom surface beveled to provide sharp edges at the scallops, a smoother trowel mounted on and depending from the rearwardmost of said carriages, drive connections from said crankshafts to said carriages for reciprocably driving said carriages along said rollers, and horizontally disposed rollers mounted on said support plates for rotation about vertical axes and engaging opposite sides of said carriages and taking the thrust of said carriages imparted thereto by travel of the machine along the ground during a floor laying operation.

References Cited by the Examiner

UNITED STATES PATENTS

| | | | |
|---|---|---|---|
| 1,978,773 | 10/1934 | Trant | 94—44 |
| 2,065,698 | 12/1936 | Heltzel | 94—44 |
| 2,372,163 | 3/1945 | Whiteman | 94—45 |
| 2,866,394 | 12/1958 | Smith | 94—45 |

JACOB L. NACKENOFF, *Primary Examiner.*